United States Patent [19]

Oswald

[11] 4,013,302
[45] Mar. 22, 1977

[54] ACOUSTICALLY ABSORBENT TRUCK TIRE SPLASH GUARD

[75] Inventor: Lawrence J. Oswald, St. Clair Shores, Mich.

[73] Assignee: General Motors Corporation, Detroit, Mich.

[22] Filed: Nov. 14, 1975

[21] Appl. No.: 631,955

[52] U.S. Cl. .................................. 280/154.5 R
[51] Int. Cl.² ................................... B62D 25/16
[58] Field of Search ............ 280/154.5 R; 181/33 G

[56] References Cited

UNITED STATES PATENTS

| | | | |
|---|---|---|---|
| 3,166,149 | 1/1965 | Hulse | 181/33 G |
| 3,211,253 | 10/1965 | Gonzalez | 181/33 G |
| 3,237,963 | 3/1966 | Menzer | 280/154.5 R |
| 3,693,750 | 9/1972 | Takkunen | 181/33 G |
| 3,770,560 | 11/1973 | Elder | 181/33 G X |
| 3,821,999 | 7/1974 | Guess | 181/33 G X |

*Primary Examiner*—Robert R. Song
*Assistant Examiner*—R. Schrecengost
*Attorney, Agent, or Firm*—Charles E. Leahy

[57] ABSTRACT

An acoustically absorbent truck tire splash guard is mounted behind the tire for absorbing noise generated by the tire. The splash guard includes a face panel which is impervious to damage by particulate matter thrown thereagainst by the tire. The face panel overlies and is juxtaposed with an acoustical foam panel of one to two inches to thickness which is effective to absorb the higher tire noise frequencies, for example, above 1,000 Hz. An array of volume resonators of the Helmholtz type is provided behind the acoustical foam panel. The volume resonators are defined by a resonator panel having a latticework which defines a plurality of cavities. The front of the resonator cavities are closed by a resonator face panel which is juxtaposed with the resonator panel and the acoustical foam panel. Openings are provided in the resonator face panel and communicate with the adjacent resonator cavities. The number or size of the openings in the resonator face panel is varied to tune the resonators over a range of frequencies such as 400, 600, and 800 Hz. so that the array gives nearly uniform noise absorption over the range of noise frequencies which are encountered over a range of vehicle speeds. A back panel is juxtaposed with the back of the volume resonator panel to form the bottom of the resonator cavities and is relatively massive, for example, greater than three pounds per square foot of surface so that it acts as an effective barrier to sound which is not absorbed by the acoustical foam panel or the volume resonators.

5 Claims, 3 Drawing Figures

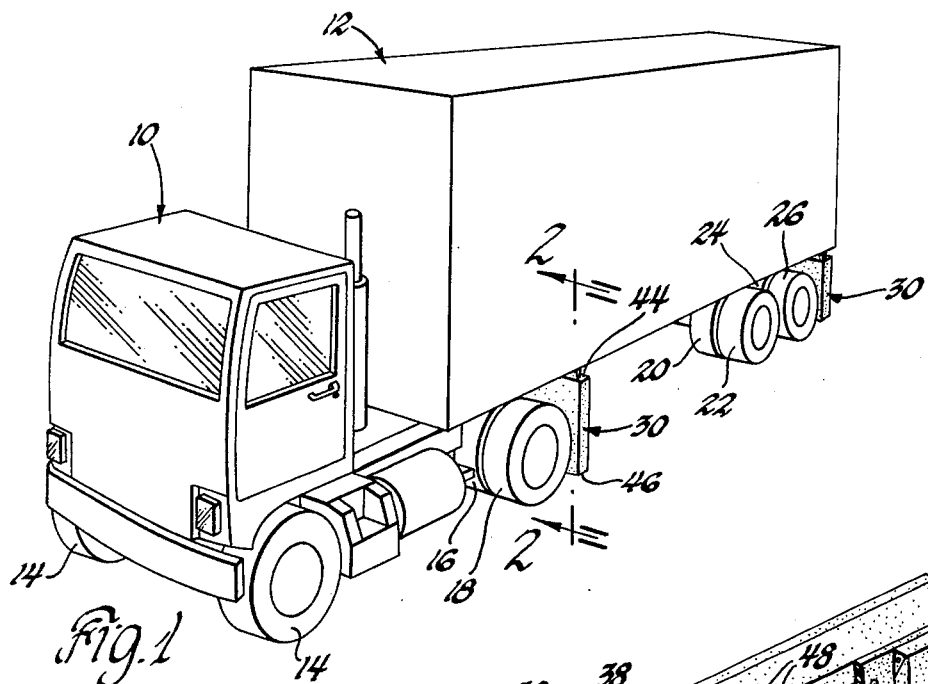
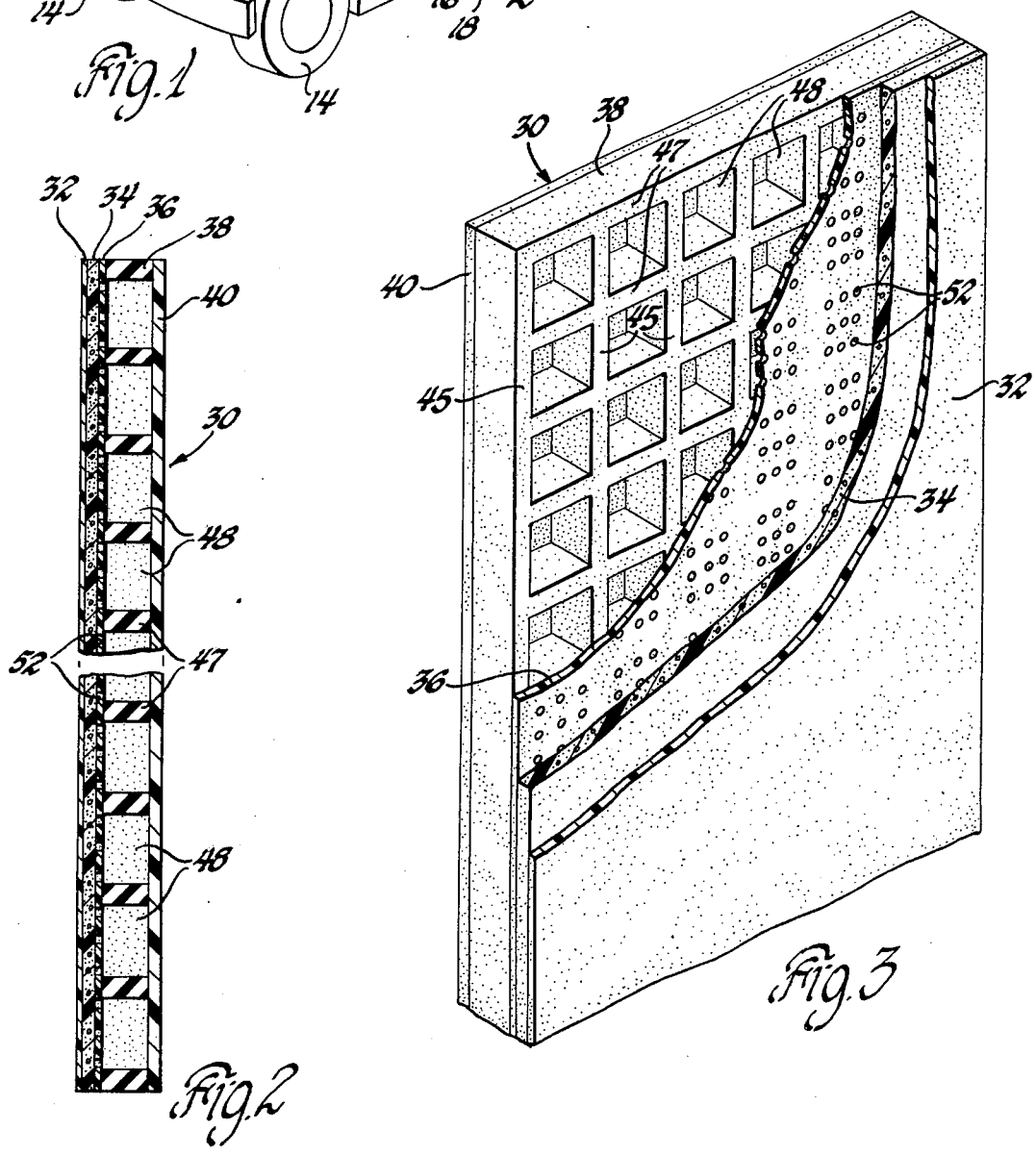

ACOUSTICALLY ABSORBENT TRUCK TIRE SPLASH GUARD

The invention relates to a splash guard or mud flap for a truck tire and more particularly to an acoustically absorbent truck tire splash guard.

It is well known in motor vehicles such as trucks to provide a splash guard or mud flap which is mounted just rearward of vehicle tires to control any mud, water, stones or other particulate matter thrown off the tire. Such splash guards are typically a large sheet of rubber or vinyl.

It is an object of this invention to provide an acoustically absorbent truck tire splash guard which is effective to reduce the sound energy emanating from the tire as it rolls on the highway.

It has been found that tires having cross bars or lugs which provide desirable wear and traction characteristics radiate most of their sound energy in the rearward direction so that a whine may be heard after the truck has passed a stationary observer.

My invention provides an acoustically absorbent truck tire splash guard which is mounted just rearward of the tire. The splash guard is a composite panel construction which includes a face panel which faces the tire and is of a thin material which is impervious to damage by particulate matter thrown thereagainst by the tire. This face panel overlies and is juxtaposed with an acoustical foam panel of one to two inches in thickness which is effective to absorb the higher tire noise frequencies, for example, above 1,000 Hz. An array of volume resonators of the Helmholtz type is provided behind the acoustical foam panel. The volume resonators are defined by a resonator panel having a latticework which defines a plurality of cavities. The front of the resonator cavities are closed by a resonator face panel which is juxtaposed with the resonator panel and the acoustical foam panel. Openings are provided in the resonator face panel and communicate with the resonator cavities defined by the latticework of the resonator panel. The number or size of these openings in the resonator face panel may be varied to tune the resonator cavities, preferably over a range of frequencies such as 400, 600, and 800 Hz. so that the array of volume resonators gives nearly uniform noise absorption over the range of noise frequencies which are encountered over a range of vehicle speeds. A back panel is juxtaposed with the back of the volume resonator panel to form the bottom of the resonator cavities and is relatively massive, for example, greater than three pounds per square foot of surface, so that it acts as an effective barrier to sound which is not absorbed by the acoustical foam panel or the volume resonators.

Referring to the drawings,

FIG. 1 is a perspective view of a tractor-trailer vehicle having acoustically absorbent splash guards according to the invention;

FIG. 2 is a sectional view of the acoustically absorbent truck tire splash guard taken in the direction of arrows 2—2 of FIG. 1; and FIG. 3 is a perspective view of the acoustically absorbent truck tire splash guard of FIG. 2 having parts broken away and in section.

Referring to FIG. 1, a conventional tractor-trailer vehicle includes a tractor 10 which provides the motive power and steering control for a trailer 12. The tractor 10 has front tires 14 which provide steering control for the tractor-trailer. The tractor 10 also has dual rear tires 16 and 18 which are driven by the engine of the tractor 10 to provide the driving traction which powers the tractor-trailer. The trailer has dual tandem wheels having tires 20, 22, 24, and 26.

The rear tires 16 and 18 of the tractor 10 are commonly of the cross bar or lug type such as the Good Year Custom Cross Rib Hi-Miler tire. Tires of this cross bar type are preferred on the drive wheels of tractors since they provide excellent traction and wear characteristics. Furthermore, many truck operators make it a practice to rotate partially worn cross bar tires from the drive wheels of the tractor to the wheels of the trailer, thereby maintaining optimum traction at the tractor by using nearly new tires at all times while at the same time placing tires with remaining wear on the trailer. Therefore, cross bar type tires are commonly used on both the tractor and the trailer.

An acoustically absorbent truck tire splash guard indicated generally at 30 is mounted behind both the drive wheels of the tractor 10 and the wheels of the trailer 12.

Referring to FIGS. 2 and 3, it will be seen that the acoustically absorbent truck tire splash guard 30 of this invention is a composite resilient panel which includes a face panel 32, an acoustical foam panel 34, a resonator face panel 36, a volume resonator panel 38, and a back panel 40. The splash guard 30 is mounted so that the face panel 32 is located in close proximity to the tire, for example, two to three inches behind the tire. The optimum effectiveness of the splash guard 30 is provided by having the top edge 44 thereof in close proximity with the underside of the trailer and the bottom edge 46 thereof in close proximity to the roadway. The face panel 32 is constructed of a flexible thin material such as Teflon which is impervious to damage by particulate matter such as stones, water and gravel which is thrown against the face panel by the tire as it rolls on the road surface.

The acoustical foam panel 34 is about one or two inches thick and is a commercially available open cell acoustical foam such as UL-94 foam made by America Acoustical Products. This acoustical foam panel is juxtaposed with the face panel 32 and is effective to absorb the higher tire noise frequencies, for example, those frequencies above 1,000 Hz.

The acoustical foam panel 34 overlies and is juxtaposed with an array of volume resonators of the Helmholtz type which is formed by a resonator face panel 36, a volume resonator panel 38, and a back panel 40. The volume resonator panel 38 is preferably of molded lead impregnated rubber and includes a plurality of vertically extending walls 45 and horizontally extending walls 47 which are arranged in latticework fashion to define a plurality of cavities 48. The front of these resonator cavities 48 are closed by the resonator face panel 36 while the back of the resonator cavities 48 are closed by the back panel 40. Openings 52 are provided in the resonator face panel 36 and communicate with the resonator cavities 48. The number and size of these openings 52 in the resonator face panel 36 may be varied to tune the resonator cavities for optimum effectiveness in absorbing noises over a broad range of frequencies. A ½ inch thickness of lead impregnated rubber is an effective face panel.

The back panel 40 which overlies the volume resonator panel 38 closes the resonator cavities 48. I have found that the back panel 40 should be relatively massive, for example, having a density greater than 3 pounds per square foot of surface so that it acts as an effective barrier to sound which is not absorbed by the acoustical foam panel or the volume resonators. I have found that lead impregnated vinyl in a ⅜ inch thickness is effective as a back panel.

Since most cross bar type tires generate whine frequencies over the range of 300 to 1,000 Hz., depending on the speed and brand of tire, it is desirable that the acoustically absorbent tire splash guard provide effective sound absorption of whine noises over this range of frequencies. I have found that an acoustically absorbent tire splash guard which has an array of Helmholtz resonators tuned to frequencies of 400, 600, and 800 Hz. will give a nearly uniform absorption of whine noises over this range of 300 to 1,000 Hz. Because of the inherent dissipation in the resonators, the resonators are effective over a range of frequencies about the tuned frequency rather than at the resonant frequency itself. Furthermore, I have found that the tuning of the resonator cavities 48 to these or other frequencies is most easily accomplished by varying the size and/or number of openings 52 leading to each resonator cavity while keeping the volume of the resonator cavities 48 constant. This tuning is accomplished by the formula:

$$f_o = \frac{C}{2\pi} \sqrt{\frac{A_o}{V(t + .8 \sqrt{A_o/n})}}$$

where
$f_o$ = the cavity resonant frequency
$C$ = speed of sound
$A_o$ = total inlet area to each resonator cavity 48
$t$ = resonator face panel 36 thickness
$n$ = number of openings in the resonator face panel 36 leading to each resonator cavity 48
$V$ = volume of the resonator cavity 48

Using this formula, the total inlet area of the openings 52 communicating with each resonator cavity 48 and the number and size of the openings 52 communicating with each of the resonator cavities 48 can be determined at each of the desired frequencies of 400, 600, or 800 Hz. I have found that 30 cubic inches is a practical volume for each resonator cavity. Furthermore, I have also found that it is practical to provide nine openings 52 in the face panel 36 over each resonator cavity 48. Accordingly, these openings can be provided by a 23/64 drill for absorbing 400 Hz., a 39/64 drill for absorbing 600 Hz., and a 57/64 drill for absorbing 800 Hz.

Thus, the invention provides a truck tire splash guard which is also an acoustically absorbing structure effective to absorb the whining noise emanating from truck tires traveling at highway speed.

What is claimed is:

1. In combination with a motor vehicle having a tire rolling on a road surface with the tire generating a whine noise over a range of frequencies and throwing particulate matter toward the tire, the combination comprising: a flexible panel mounted closely adjacent and rearward the tire for deflecting particulate matter thrown thereagainst by the rolling tire; a panel of open cell sound absorbing foam underlying the face panel for protection against the particulate matter and effective to absorb the higher whine noise frequencies generated by the tire; a plurality of Helmholtz resonators juxtaposed with the panel of open cell sound absorbing foam and being tuned to resonant frequencies varying over the range of whine noise frequencies generated by the tire for absorbing the whine noise; and a back panel juxtaposed with the volume resonators and having a high density effective as a barrier to those whine noise frequencies which are not absorbed by the panel of acoustical foam and the Helmholtz resonators.

2. A tire splash guard for mounting behind the tire of the motor vehicle to control particulate matter thrown off the tire and to absorb noise generated by the tire as it rolls on the road surface, said splash guard comprising:
a face panel facing the tire and being impervious to damage by particulate matter thrown thereagainst by the tire;
a panel of open cell acoustical foam juxtaposed with the face panel for absorbing the higher noise frequencies above approximately 1,000 Hz.;
panel means juxtaposed with the panel of open cell acoustical foam and defining a plurality of Helmholtz resonators, said Helmholtz resonators being displayed in an ordered array and being tuned to resonant frequencies varying between 300 Hz. and 1,000 Hz. and each of the resonators being effective to absorb a range of frequencies about the resonant frequency so as to provide nearly uniform sound absorption over the range of approximately 300 to 1,000 Hz.;
and a back panel juxtaposed with the volume resonator panel and having a density of not less than approximately three pounds per square foot of surface to be effective as a barrier to noise frequencies which are not absorbed by the panel of acoustical foam and the Helmholtz resonators.

3. The tire splash guard for mounting behind the tire of a motor vehicle to control particulate matter thrown off the tire and to absorb noise generated by the tire as it rolls on the road surface, said panel comprising:
a face panel facing the tire and being impervious to damage by particulate matter thrown thereagainst by the tire;
an acoustical foam panel contacting the face panel for absorbing the relatively higher noise frequencies generated by the tire;
a resonator face panel contacting the acoustical foam panel;
a volume resonator panel contacting the resonator face panel and defining a plurality of resonator cavities;
a back panel contacting the volume resonator panel to define the bottom of the resonator cavities;
and a plurality of openings in the resonator face panel to communicate sound into the resonator cavities defined by the volume resonator panel.

4. A tire splash guard for mounting behind the tire of a motor vehicle to control particulate matter thrown off the tire and to absorb noise generated by the tire as the tire rolls on the road surface, said splash guard comprising:
a face panel mounted closely adjacent and rearward the tire for deflecting particulate matter thrown thereagainst by the rolling tire and permitting passage of noise therethrough;
a sound absorbing structure juxtaposed with the face panel oppositely of the tire for protection against the particulate matter and being effective to absorb noise generated by the tire as it rolls on the road surface;

and a back panel juxtaposed with the sound absorbing panel and being relatively dense so as to be effective as a barrier to noise which is not absorbed by the sound absorbing structure.

5. A tire splash guard for mounting behind the tire of a motor vehicle to control particulate matter thrown off the tire and to absorb noise generated by the tire as the tire rolls on the road surface, said splash guard comprising:

- a face panel mounted closely adjacent and rearward the tire for deflecting particulate matter thrown thereagainst by the rolling tire;
- a first sound absorbing panel juxtaposed with the face panel oppositely of the tire for protection against the particulate matter and adapted to absorb a range of the relatively higher frequency noise generated by the rolling tire;
- a second sound absorbing panel juxtaposed with the first sound absorbing panel and adapted to absorb a range of relatively lower frequency noise generated by the rolling tire;
- and a back panel juxtaposed with the second sound absorbing panel and being relatively dense so as to be effective as a barrier to those noise frequencies which are not absorbed by the first and second sound absorbing panels.

* * * * *